(12) United States Patent
Stanzione (10) Patent No.: US 10,595,573 B2
(45) Date of Patent: Mar. 24, 2020

(54) METHODS, SYSTEMS, AND DEVICES FOR PROTECTION FROM IMPACT FORCES

(71) Applicant: Kaydon A. Stanzione, Sewell, NJ (US)

(72) Inventor: Kaydon A. Stanzione, Sewell, NJ (US)

(*) Notice: Subject to any disclaimer, the term of this patent is extended or adjusted under 35 U.S.C. 154(b) by 399 days.

(21) Appl. No.: 15/201,902

(22) Filed: Jul. 5, 2016

(65) Prior Publication Data

US 2016/0309807 A1 Oct. 27, 2016

Related U.S. Application Data

(63) Continuation-in-part of application No. 14/475,978, filed on Sep. 3, 2014, now abandoned.

(60) Provisional application No. 61/873,015, filed on Sep. 3, 2013.

(51) Int. Cl.
| | |
|---|---|
| *A41D 13/015* | (2006.01) |
| *A41D 1/00* | (2018.01) |
| *A41D 13/05* | (2006.01) |
| *A63B 71/08* | (2006.01) |
| *G01L 5/00* | (2006.01) |
| *A63B 71/12* | (2006.01) |
| *A63B 71/06* | (2006.01) |

(52) U.S. Cl.
CPC ........... *A41D 13/015* (2013.01); *A41D 1/002* (2013.01); *A41D 13/0512* (2013.01); *A63B 71/08* (2013.01); *A63B 71/12* (2013.01); *G01L 5/0052* (2013.01); *A63B 71/0622* (2013.01); *A63B 2071/1208* (2013.01); *A63B 2207/02* (2013.01); *A63B 2209/10* (2013.01); *A63B 2220/40* (2013.01); *A63B 2220/53* (2013.01); *A63B 2220/80* (2013.01); *A63B 2225/09* (2013.01); *A63B 2225/50* (2013.01)

(58) Field of Classification Search
CPC .. A41D 13/015; A41D 13/05; A41D 13/0506; A41D 13/0525
See application file for complete search history.

(56) References Cited

U.S. PATENT DOCUMENTS

| | | | | |
|---|---|---|---|---|
| 2,461,201 | A | * | 2/1949 | Ellis ........................ A41F 1/002 |
| | | | | 174/126.4 |
| 3,878,561 | A | * | 4/1975 | Winiecki ........... A41D 13/0155 |
| | | | | 2/455 |
| 5,634,857 | A | * | 6/1997 | Bradshaw .............. A63B 53/10 |
| | | | | 473/238 |

(Continued)

*Primary Examiner* — Sally Haden
(74) *Attorney, Agent, or Firm* — Stradley Ronon Stevens & Young, LLP (57) ABSTRACT

Protective gear for protecting individuals from impact forces by transferring axial forces into tangential forces directed away from the individual. The protective apparatus includes a first plate assembly including a first end and a second end; a second plate assembly including a first end and a second end; a load-bearing hinge connecting the first end of the first plate assembly to the first end of the second plate assembly; a first toothed plate attached to the second end of the first plate assembly; and a second toothed plate attached to the second end of the second plate assembly. The load-bearing hinge and the toothed plates tangentially distribute impact forces between the plate assemblies and around, rather than axially toward, the body or object being protected. The apparatus may further include sensors and electronics for detecting a physical property of the protective apparatus, and transmitting signals to a remote server.

15 Claims, 11 Drawing Sheets

(56) References Cited

U.S. PATENT DOCUMENTS

| | | | | |
|---|---|---|---|---|
| 5,657,516 A * | 8/1997 | Berg | ............ | A44B 18/0053 |
| | | | | 24/306 |
| 6,137,675 A * | 10/2000 | Perkins | ............ | G06F 1/163 |
| | | | | 128/876 |
| 6,243,907 B1 * | 6/2001 | Wagner | ............ | A47L 23/22 |
| | | | | 15/112 |
| 6,579,161 B1 * | 6/2003 | Chesley | ............ | A44B 18/00 |
| | | | | 451/359 |
| 2002/0020000 A1 * | 2/2002 | Garcia | ............ | A41D 13/0506 |
| | | | | 2/23 |

* cited by examiner

METHODS, SYSTEMS, AND DEVICES FOR PROTECTION FROM IMPACT FORCES

CROSS REFERENCE TO RELATED APPLICATIONS

This application is a continuation-in-part of U.S. patent application Ser. No. 14/475,978 titled "METHODS, SYSTEMS AND DEVICES FOR MEASURING AND MONITORING IMPACT FORCES IMPARTED TO INDIVIDUALS AND PROTECTING INDIVIDUALS FROM IMPACT FORCES," filed on Sep. 3, 2014, which claims priority to U.S. Provisional Patent Application No. 61/873, 015, filed Sep. 3, 2013. The contents of these applications are incorporated by reference in this document, in their entirety and for all purposes.

TECHNICAL FIELD

The present invention relates generally to protective equipment, and particularly to protective equipment with interconnecting hardware which tangentially distributes impact forces away from the direction of the object being protected.

BACKGROUND OF THE INVENTION

Impact forces may be imparted to people, animals, or objects in a variety of environments or circumstances. For example, in sports activities, in military operations, in law enforcement duties, and even with patients before, during, or after medical procedures, impact forces may be imparted to an individual. Such forces, if large or severe enough, could result in injury or trauma to the individual, for example to muscular, skeletal, and nervous systems and internal organs.

Wearable protective gear is traditionally manufactured to protect the wearer from such impact forces. Exemplary wearers include athletes, police officers, and military personnel. Currently available protective gear typically consists of a synthetic fiber with high tensile strength and armor plating. This gear, however, is typically hot, heavy, uncomfortable, and costly, making it often impractical for use by workers in hazardous environments such as construction and firefighting or by consumers for personal protection at work, home, school, or public places. Existing systems often claim to transmit a portion of axial impact forces in a lateral or tangential direction, but the majority of the impact force is still propelled in the axial direction and is eventually transferred to the body or object being protected. Rigid plate protection distributes impact forces over the cross-section of the rigid plate, but forces are still axially transmitted to the object under protection and the distributed load is a factor of the surface area of the rigid plate. This limits the degree to which the force can be distributed and makes protecting small objects impractical or cost-prohibitive. The synthetic fibers which connect the rigid plates also do not form a continuous closed system which prevents the forces from being transmitted along a tangential axis between plates. Existing protective gear further lacks mechanisms to determine if the integrity of the protection system has been compromised, and are often unable to expand or contract to protect objects of various sizes and shapes.

Current design trends in protective equipment include incorporating gel technology to further dissipate impact energy peripherally (i.e., tangentially to the object being protected) as opposed to axially (i.e., toward the body or object being protected). However, gel systems still fail to practically minimize the axial force of a large impact. Rather, gel systems offer a force profile that includes a spike at the point of impact with an asymptotic peripheral decay away from the point of impact. At and around the impact point, gel systems can still transmit a considerable force through to the body. Accordingly, a need exists for protective equipment which further reduces axial forces resulting from impact.

Often times, the effect of an impact force on an individual is not fully recognized or known because of the event in which the force is imparted, or simply because the injury or trauma does not immediately manifest into an observable effect. Although there has been a known need to minimize impact forces that may be transmitted to or imparted to an individual's body (including the head) to reduce, among other injuries, brain trauma, current technology does not provide effective means for monitoring, measuring or protecting an individual without severely restricting motion or comfort. Moreover, current devices and systems do not provide for an ability to measure or monitor impact forces, or to analyze such data in real-time and provide an alert to a remote device should the analyzed data show that an alert condition has occurred. Accordingly, a need also exists for methods, systems, and devices that measure and monitor impact forces imparted to individuals, and for protecting individuals from impact forces.

SUMMARY OF THE INVENTION

Embodiments of the present invention include protective gear for protecting individuals, animals, or objects from impact forces by transferring axial impact forces into tangential forces directed away from the individual.

In one embodiment, a protective apparatus includes a first plate assembly including a first end and a second end; a second plate assembly including a first end and a second end; a load-bearing hinge connecting the first end of the first plate assembly to the first end of the second plate assembly; a first toothed plate attached to the second end of the first plate assembly; and a second toothed plate attached to the second end of the second plate assembly. When the hinge is closed, the second end of the first plate assembly and the second end of the second plate assembly overlap and combine to define a closed interior space, which may be lined with a flexible inner padding layer. The inner padding layer may be attached either the first plate assembly or the second plate assembly, and may be made of an open-cell foam. The inner padding layer may include a plurality of slots aligned with a plurality of holes in the first plate assembly and the second plate assembly. The first toothed plate interlocks with the second toothed plate to connect the second end of the first plate assembly and the second end of the second plate assembly. The first plate assembly and the second plate assembly may each include at least an outside plate, an inside plate, and an internal padding layer separating the outside plate and the inside plate. The outside plate and the inside plate may be made of polycarbonate and the internal padding layer may be made of a closed-cell foam. The outside plate, the inside plate, and the internal padding layer may be wrapped in a carbon fiber-reinforced polymer sealing layer. The first toothed plate may include a first plurality of teeth angled toward second end of the first plate assembly each having a protrusion pointed toward the second end of the first plate assembly; and the second toothed plate may include a second plurality of teeth angled toward second end of the second plate assembly having a recess pointed toward the second end of the first plate assembly. The protrusions of the first plurality of teeth fit into the recesses in the second plurality of teeth to interlock the first toothed plate and the second toothed plate.

The apparatus may further include an outer containment belt which wraps around the first plate assembly, the second plate assembly, the load-bearing hinge, the first toothed plate, and the second toothed plate. The outer containment belt has a first end and a second end which removably attaches to the first end, for example using a fabric hook-and-loop fastener.

The apparatus may further include a continuous thin-film electrically conductive membrane applied across one or more surfaces of the front plate assembly, the back plate assembly, and the hinge. The continuous thin-film electrically conductive membrane may include two terminal pads which allow the conductivity between the terminal pads to be read using an ohm meter, or may be used in conjunction with a battery powered circuit including an LED display which changes states after a change in conductivity across the conductive membrane. The apparatus may further include sensors and electronics for detecting a physical property of the protective apparatus, for example impact forces imparted to the protective apparatus, and transmitting a signal generated by the sensors to a remote server.

In another embodiment, a protective apparatus includes a plate assembly including a first end and a second end; and a lateral load dispersion connector including a first channel and a second channel at each end of a connecting bar. The first end of the plate assembly is inserted into the first channel and the second end of the plate assembly is inserted into the second channel. The plate assembly may include an inside plate, an outside plate, and an internal padding layer separating the inside plate and the outside plate. The outside plate and the inside plate may be made of polycarbonate and the internal padding layer is made of a closed-cell foam. The outside plate, the inside plate, and the internal padding layer may be wrapped in an carbon fiber-reinforced polymer sealing layer.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

Referring now to the drawing, in which like reference numbers refer to like elements throughout the various figures that comprise the drawing, embodiments of the present invention include methods, systems, and devices for protecting individuals from impact forces. Embodiments of the invention include wearable protective gear having interconnecting hardware which tangentially distributes impact forces around, rather than axially toward, the body or object being protected. Exemplary protective gear includes a combination of flexible and porous membranes and impact resistant materials attached by the interconnecting hardware. The design substantially reduces direct axial forces by redistributing the forces in either a tangential or horizontal plane, and can be used to protect objects of any size and shape, for example the torso of a human being. For example, the protective gear may include two or more hardened plate assemblies that are connected with double-channel load-bearing hinges and the interlocking load-bearing teeth. The double-channel load-bearing hinges and interlocking load-bearing teeth transmit tangential forces between the plate assemblies and allow the protective gear to direct a greater percentage of axial impact forces away from the person or object being protected than existing protective technologies. The outside of the plate assemblies may be wrapped with a non-abrasive elastic material and lined with energy-absorbing foam. In some embodiments, the protective gear may further include built-in cooling, pressure relief, and/or diagnostic systems to determine if an impact force has damaged the integrity of the protective system. The protective gear may be suitable for use in any number of activities, including, but not limited to, football, hockey, lacrosse, roller derby, baseball, soccer, skiing, snowboarding, rugby, gymnastics, airsoft, equestrienne events, rodeo, rock climbing, motocross, bike riding, skateboarding, roller skating, boxing, martial arts, and auto racing. The protective gear may also be used by first responders including, but not limited, police, firefighters, and military personnel, or by any other user in hazardous situations where impacts are likely, including, but not limited to, construction, demolition, logging, and rigging.

Figure 1:
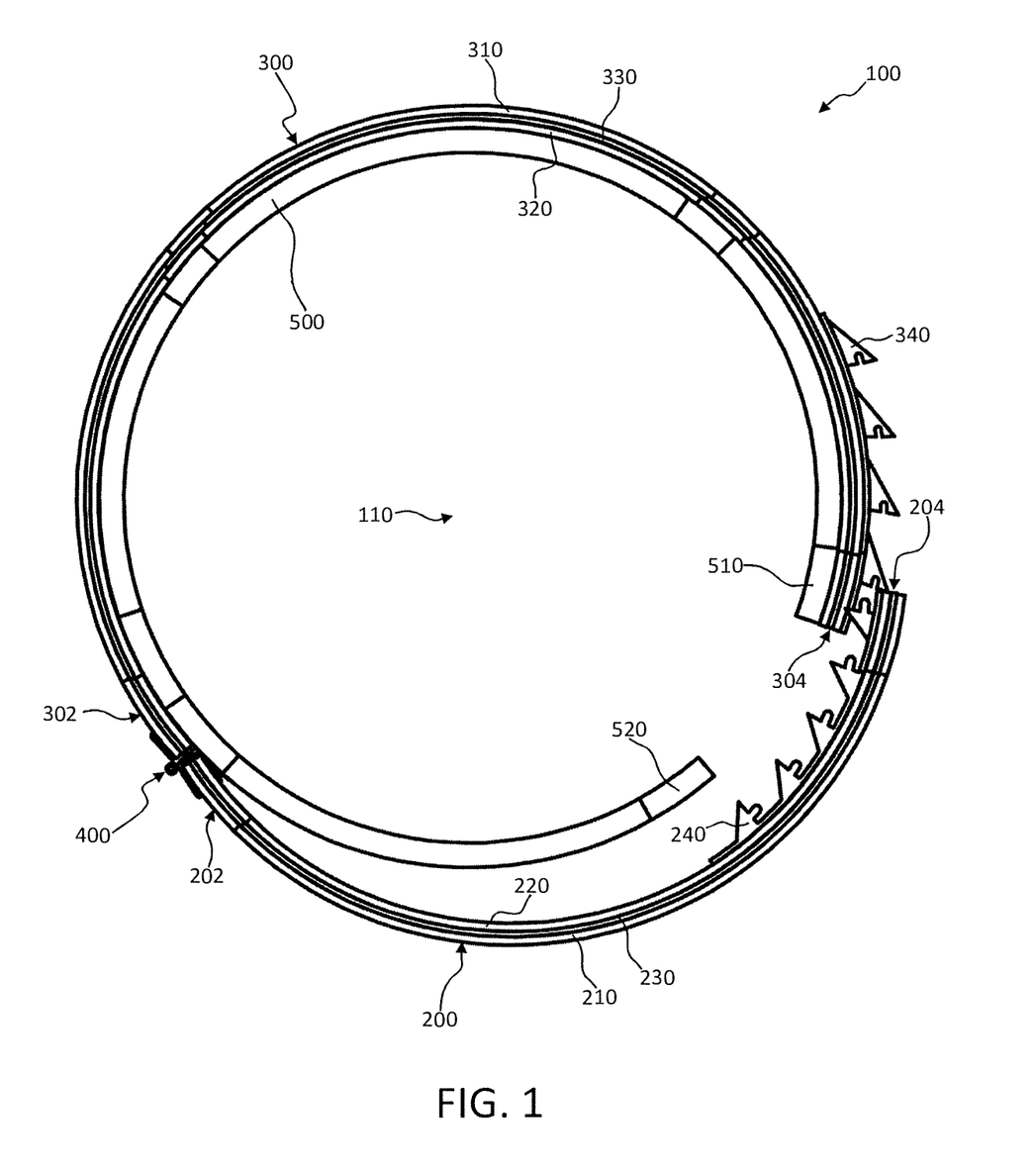
FIG. 1 is a top view of a protective apparatus, according an embodiment of the present invention.
Figure 2:
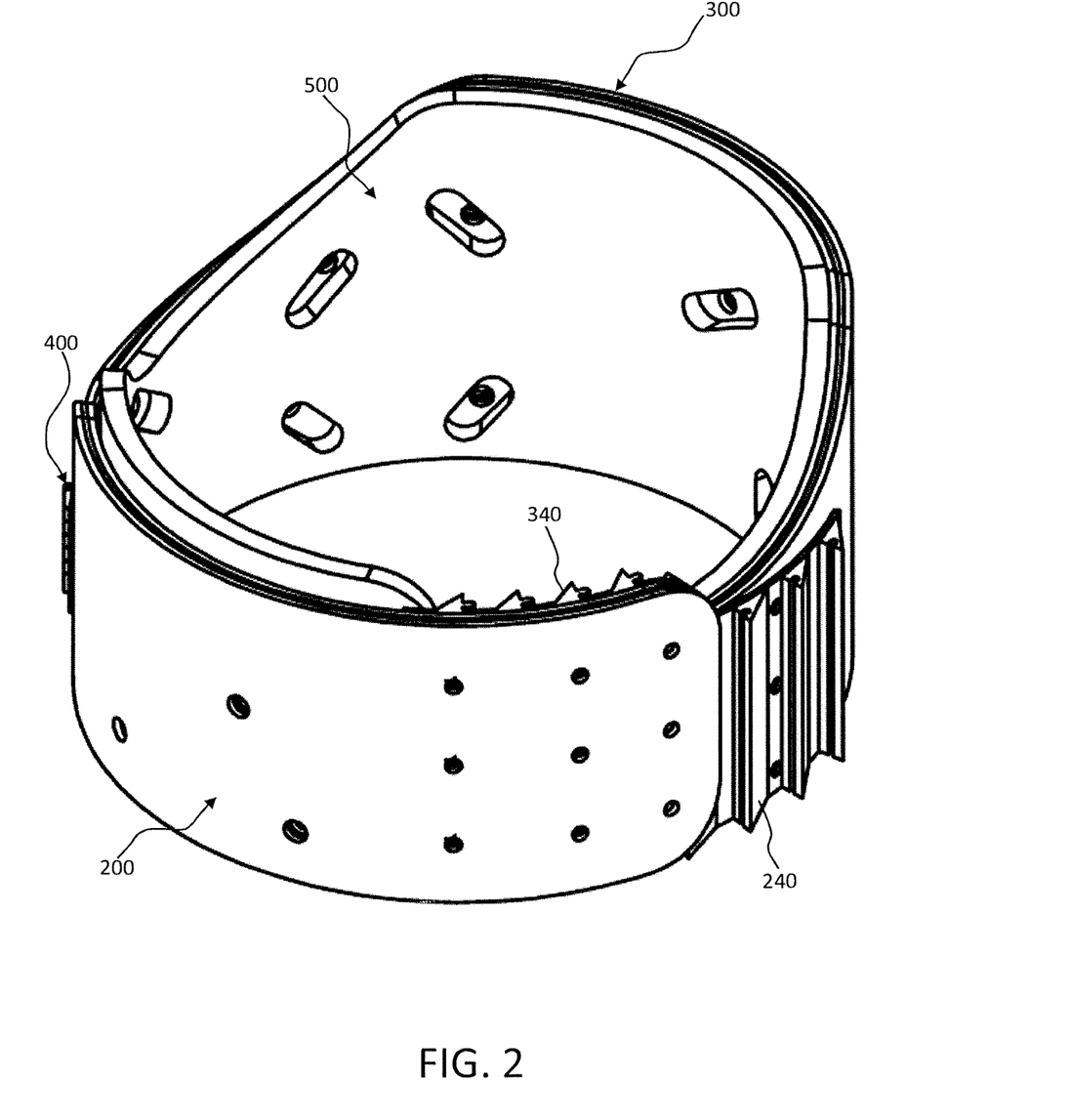
FIG. 2 is a perspective view of the protective apparatus of FIG. 1, according an embodiment of the present invention.
Figure 3:
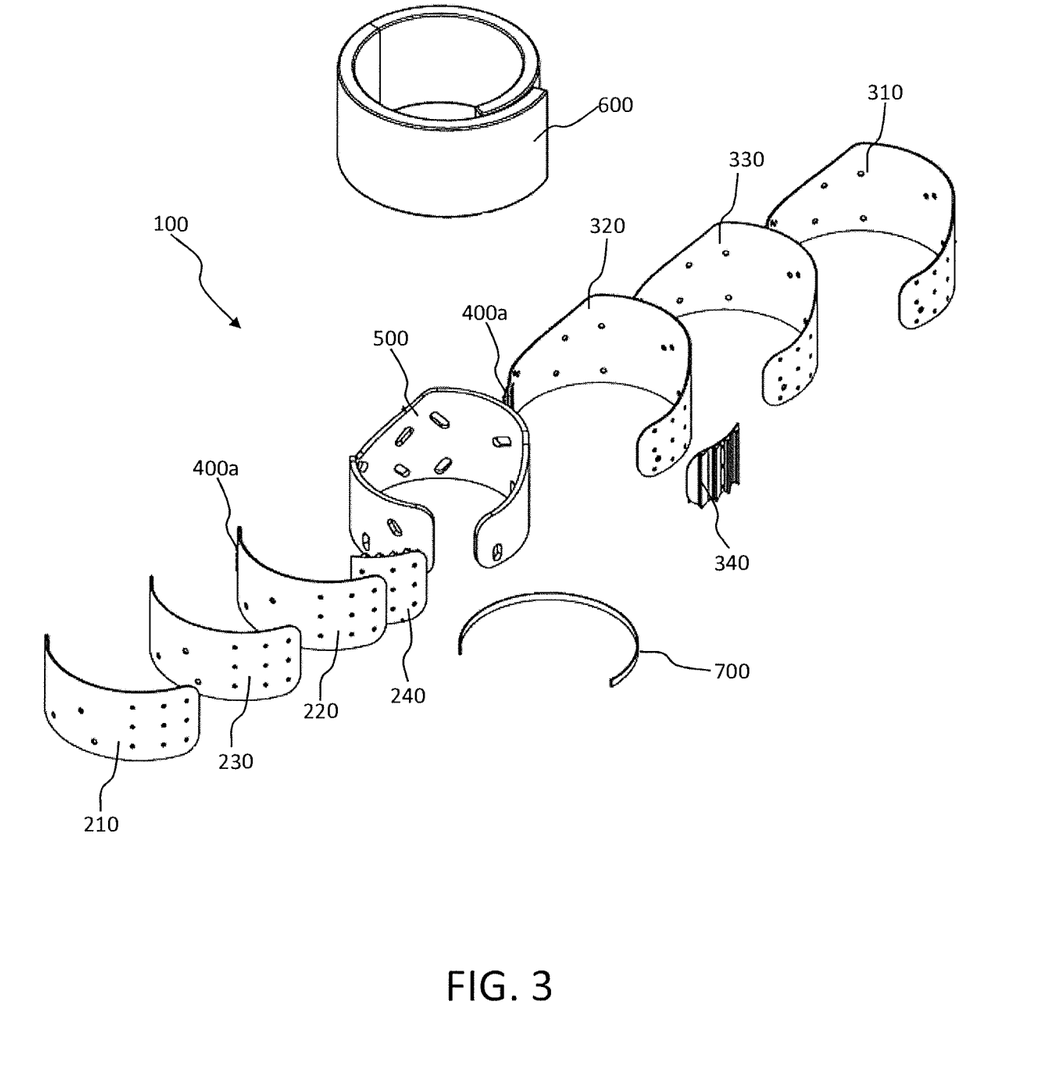
FIG. 3 is an exploded view of the protective apparatus of FIG. 1, according an embodiment of the present invention.

Referring to FIGS. 1-3, an exemplary protective apparatus 100 is provided. FIG. 1 is a top view of the protective apparatus 100, FIG. 2 is a perspective view of the protective apparatus 100, and FIG. 3 is an exploded view of the protective apparatus 100. The protective apparatus 100 includes a front plate assembly 200 and a back plate assembly 300. A first end 202 of the front plate assembly 200 and a first end 302 of the back plate assembly 300 are joined by a hinge 400. When the hinge 400 is closed, a second end 204 of the front plate assembly 200 overlaps with a second end 304 of the back plate assembly 300 such that the front plate assembly 200 and the back plate assembly 300 combine to define a closed interior space 110 within the protective apparatus 100. As depicted in FIG. 1, the closed interior space 110 is substantially round in cross section, but may have any suitable shape. The shape of the interior space 110 will vary based on the object to be protected. For example, the round shape of the closed interior space 110 in FIG. 1 may be suitable for protecting the torso of a human being. A front toothed plate 240 is attached to the second end 204 of the front plate assembly 200 and a back toothed plate 340 is attached to the second end 304 of the back plate assembly 300. As explained in more detail below, the front toothed plate 240 and the back toothed plate 340 interlock to form a load-bearing connection between the second end 204 of the front plate assembly 200 and the second end 304 of the back plate assembly 300.

Figures 4, 5, 6:
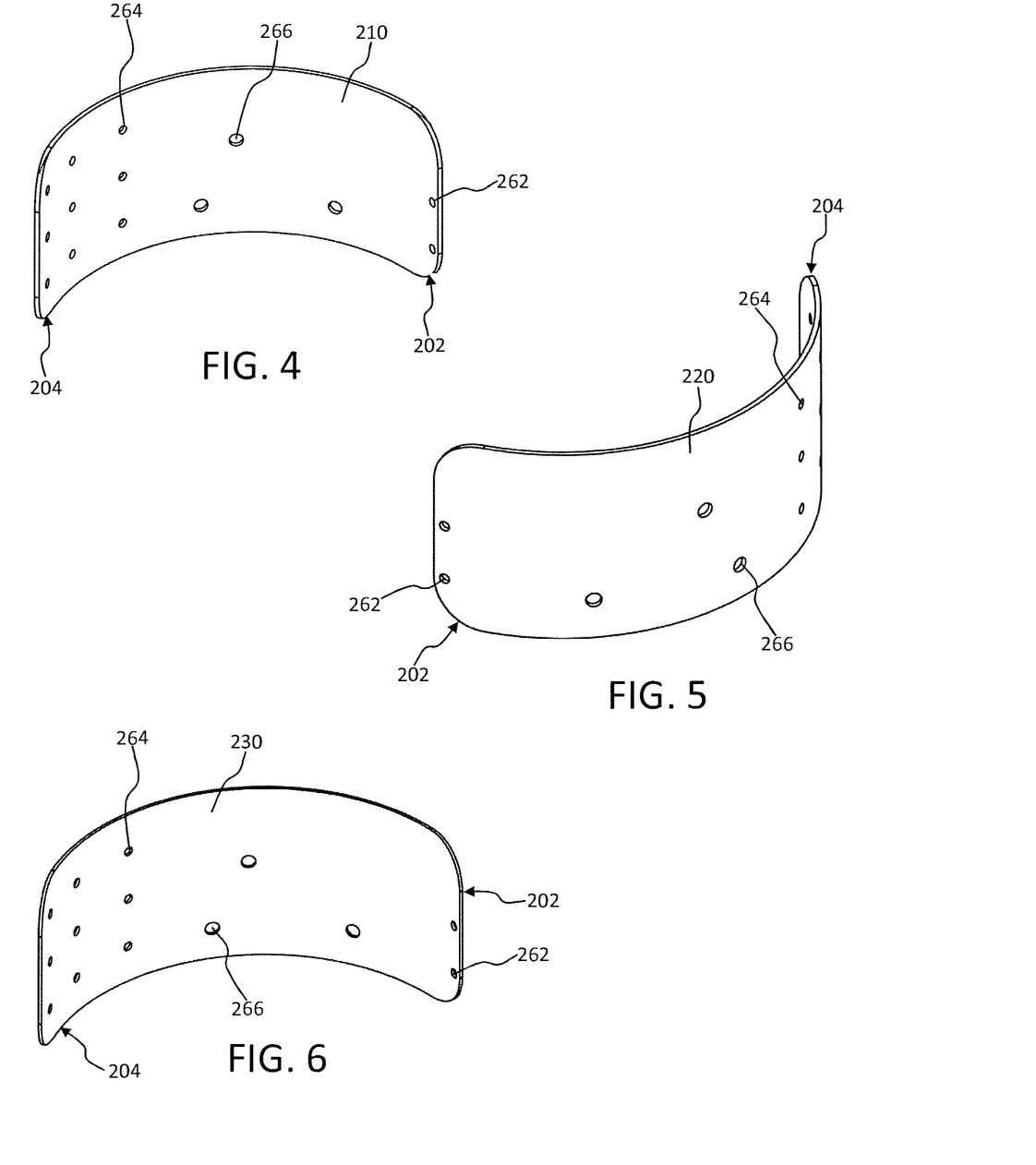
FIG. 4 is a perspective view of an outside front plate of the protective apparatus of FIG. 1, according an embodiment of the present invention.
FIG. 5 is a perspective view of an inside front plate of the protective apparatus of FIG. 1, according an embodiment of the present invention.
FIG. 6 is a perspective view of a front internal padding layer of the protective apparatus of FIG. 1, according an embodiment of the present invention.
Figure 7:
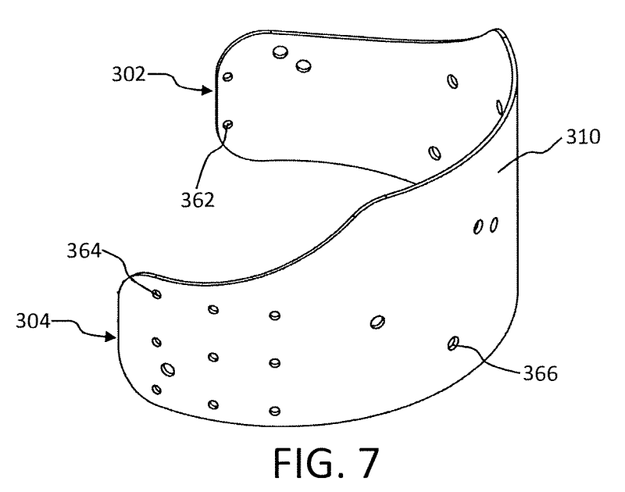
FIG. 7 is a perspective view of an outside back plate of the protective apparatus of FIG. 1, according an embodiment of the present invention.
Figure 8:
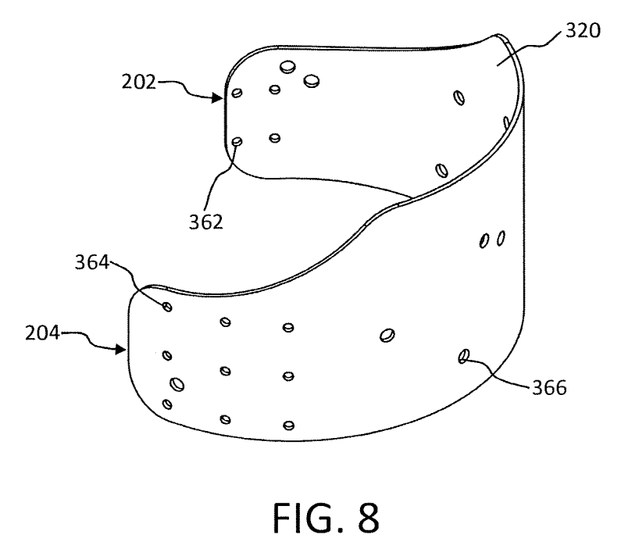
FIG. 8 is a perspective view of an inside back plate of the protective apparatus of FIG. 1, according an embodiment of the present invention.
Figure 9:
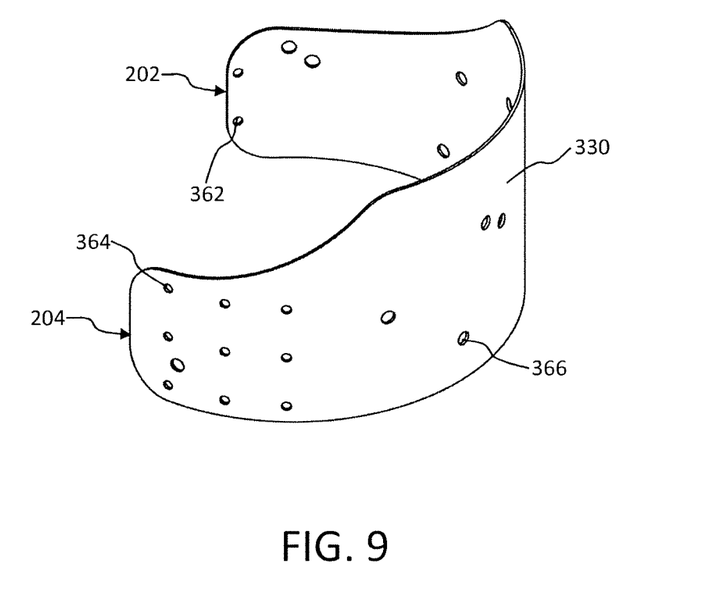
FIG. 9 is a perspective view of a back internal padding layer of the protective apparatus of FIG. 1, according an embodiment of the present invention.

Each of the front plate assembly 200 and the back plate assembly 300 are constructed of multiple layers including a force absorbing layer sandwiched between two plate layers. In an exemplary embodiment, the front plate assembly 200 includes an outside front plate 210 (FIG. 4), an inside front plate 220 (FIG. 5), and a front internal padding layer 230 (FIG. 6) between the outside front plate 210 and the inside front plate 220. The back plate assembly 300 includes an outside back plate 310 (FIG. 7), an inside back plate 320 (FIG. 8), and a back internal padding layer 330 (FIG. 9) between the outside back plate 310 and the inside back plate 320. The outside front plate 210, the inside front plate 220, the outside back plate 310, and the inside back plate 320 may be made any suitable substantially rigid protective material, for example polycarbonate plate having a thickness of approximately 0.125 inches. The material composition and thickness of the outside front plate 210, the inside front plate 220, the outside back plate 310, and the inside back plate 320 will vary based on the anticipated maximum axial force the protective apparatus 100 will be subjected too. Each of the outside front plate 210, the inside front plate 220, the outside back plate 310, and the inside back plate 320 may have substantially the same or substantially different thicknesses. Typically, the thickness and material composition of the outside front plate 210 and the inside front plate 220 will be substantially similar, and the thickness and material composition of the outside back plate 310 and the inside back plate 320 will be substantially similar. The front internal padding layer 230 and the back internal padding layer 330 may be made of a foam material, preferably a closed-cell foam arranged in a checkerboard pattern having a thickness of approximately 0.1 inches. Each of the front plate assembly 200 and the back plate assembly 300 may be wrapped in, and sealed by, a sealing layer (not shown), for example a layer of carbon fiber reinforced polymer resin (e.g., epoxy). Each of the front plate assembly 200 and the back plate assembly 300 may also include one or more additional layers (not shown), for example an additional inner plate sandwiched between two internal padding layers.

Each of the outside front plate 210, the inside front plate 220, and the front internal padding layer 230 include a first plurality of aligned holes 262 at the first end 202 of the front plate assembly 200 for attaching the front plate assembly 200 to the hinge 400, a second plurality of aligned holes 264 at the second end 204 of the front plate assembly 200 for attaching the front plate assembly 200 to the front toothed plate 240. Each of the outside back plate 310, the inside back plate 320, and the back internal padding layer 330 include a first plurality of aligned holes 362 at the first end 302 of the back plate assembly 300 for attaching the back plate assembly 300 to the hinge 400, a second plurality of aligned holes 364 at the second end 304 of the back plate assembly 300 for attaching the back plate assembly 300 to the back toothed plate 340.

Figure 10:
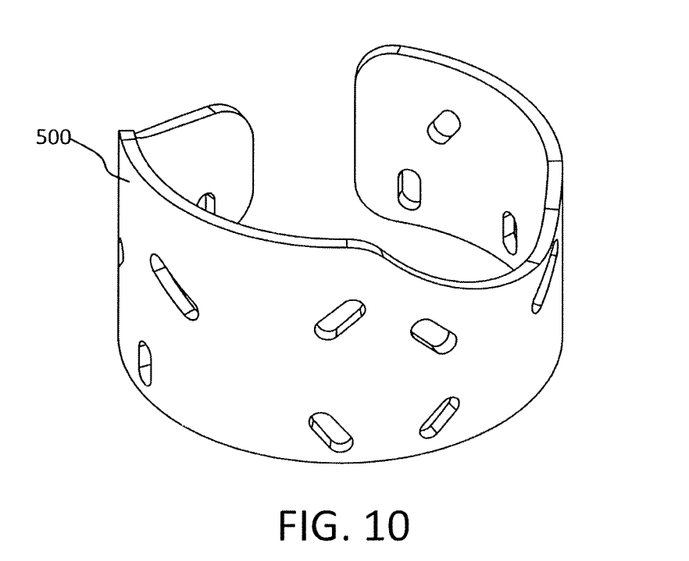
FIG. 10 is a perspective view of an inner padding layer of the protective apparatus of FIG. 1, according an embodiment of the present invention.

The interior space 110 is lined with a flexible inner padding layer 500 (FIG. 10) which is attached to the back plate assembly 300. The inner padding layer 500 will dampen any residual axial force that isn't transformed into tangential forces by the front plate assembly 200 and the back plate assembly 300. The inner padding layer 500 includes a first end 510 and a second end 520. The first end 510 may be either attached or unattached from the back plate assembly 300. The second end 520 is unattached, allowing the first end 510 and the second end 520 to be separated to allow the object to be protected to be inserted into the interior space 110. In a unflexed position, the first end 510 and the second end 520 are substantially adjacent such that the flexible inner padding layer 500 substantially circumscribes the interior space 110. In an exemplary embodiment, the inner padding layer 500 is made of an open cell foam, for example an open cell foam having a minimum Indentation Force Deflection of 25% less than 80 pounds. The nominal thickness may be approximately 0.375 inches, but both the thickness and material composition of the inner padding layer 500. In embodiments where the protective apparatus 100 is used to protect a human being, the inner padding layer 500 is preferably made of an antimicrobial material. In some embodiments, the inner padding layer 500 may include a plurality of slots 530 which allow air to move in and out of the interior space 110. The slots 530 are aligned with a third plurality of holes 266 in the front plate assembly 200 and a third plurality of holes 366 in the back plate assembly 300. The slots 530 and holes 266, 366 serve at least three purposes. First, the slots 530 and holes 266, 366 cool the interior space 110 by encouraging airflow around the object being protected. Second, they reduce the effects of an impact force by enabling air pressure resulting from the impact to be released. Third, they provide crack propagation relief when the front plate assembly 200 and the back plate assembly 200 are over stressed. The size and shape of the cooling channels 530 and the holes 266, 366 will vary depending on the type of object being protected.

Figure 11:
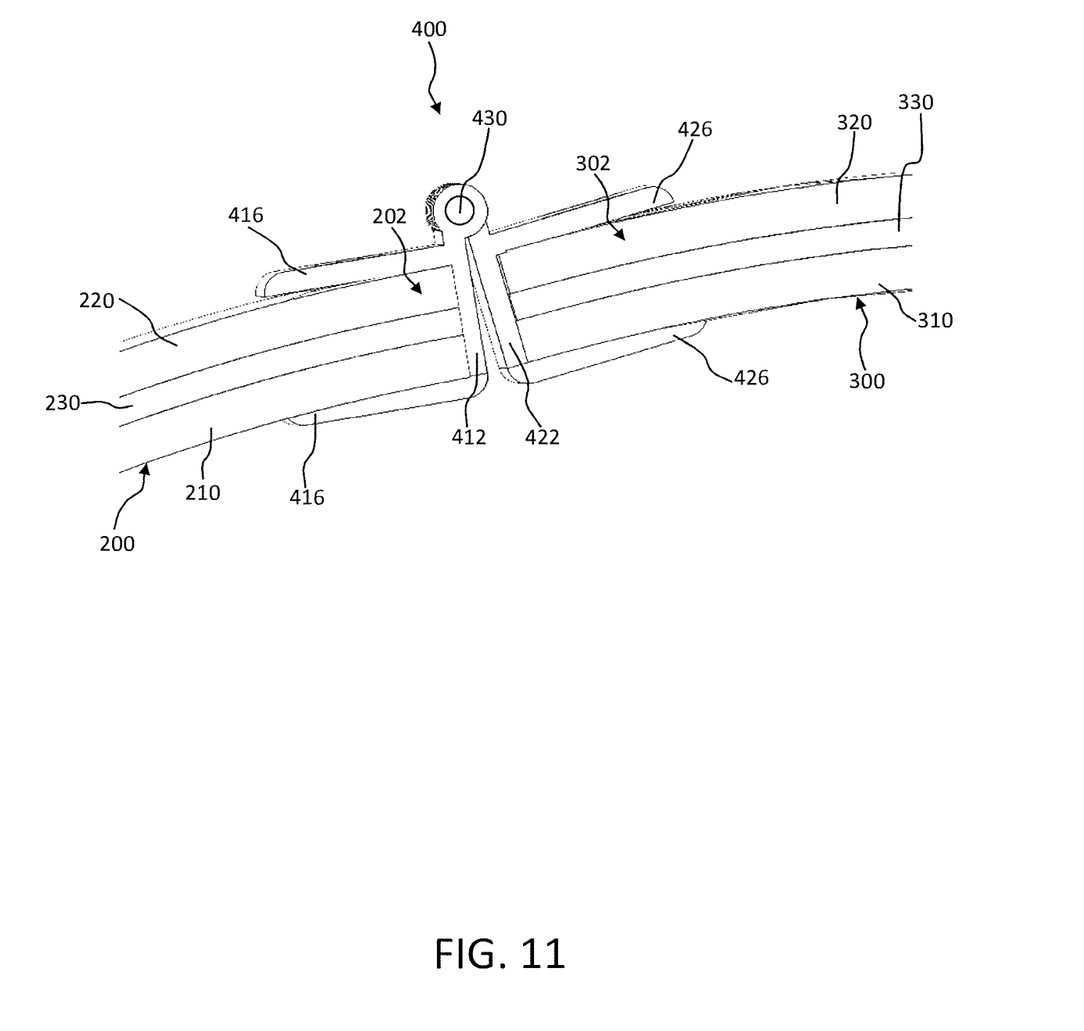
FIG. 11 is a top view of the hinge of the protective apparatus of FIG. 1, according to an embodiment of the present invention.

The first end 202 of the front plate assembly 200 and the first end 302 of the back plate assembly 300 are joined by the hinge 400. The hinge 400, shown in greater detail in FIG. 11, includes a first channel portion 410 and a second channel portion 420. The first channel portion 410 includes a first butt plate 412 and two legs 416 each joined to a side of the first butt plate 412, and defines a first channel 418. The second channel portion 420 includes a second butt plate 422 and two legs 426 each joined to a side of the second butt plate 422, and defines a second channel 428. The first channel portion 410 and the second channel portion 420 are joined by a pivot pin 430, which allows the first butt plate 412 and the second butt plate 422 to pivot with respect to the pivot pin 430. When the hinge 400 is in a closed positon, the first butt plate 412 is substantially in contact with the second butt plate 422, allowing force to be transmitted between the first butt plate 412 and the second butt plate 422. The first end 202 of the front plate assembly 200 and the first end 302 of the back plate assembly 300 are inserted into the first channel portion 410 and the second channel portion 420, respectively, and secured in place, for example by rivets, such that force is transmitted between the front plate assembly 200 and the back plate assembly 300 through the hinge 400. The legs 416 and the legs 426 may be angled with respect to the first butt plate 412 and the second butt plate 422 such that the front plate assembly 200 and the back plate assembly 300 may be held at any suitable angle. The hinge 400 is positioned such that the pivot pin 430 faces away from the interior space 110 of the protective apparatus 100. Accordingly, the hinge 400 can be opened to separate the second end 204 of the front plate assembly 200 and the second end 304 of the back plate assembly 300 to allow the object to be protected to be inserted into the interior space 110. The hinge 400 may be made of any suitable material which will vary based on the anticipated magnitude of the impact forces, for example aluminum, titanium, steel, or composites.

Figure 12:
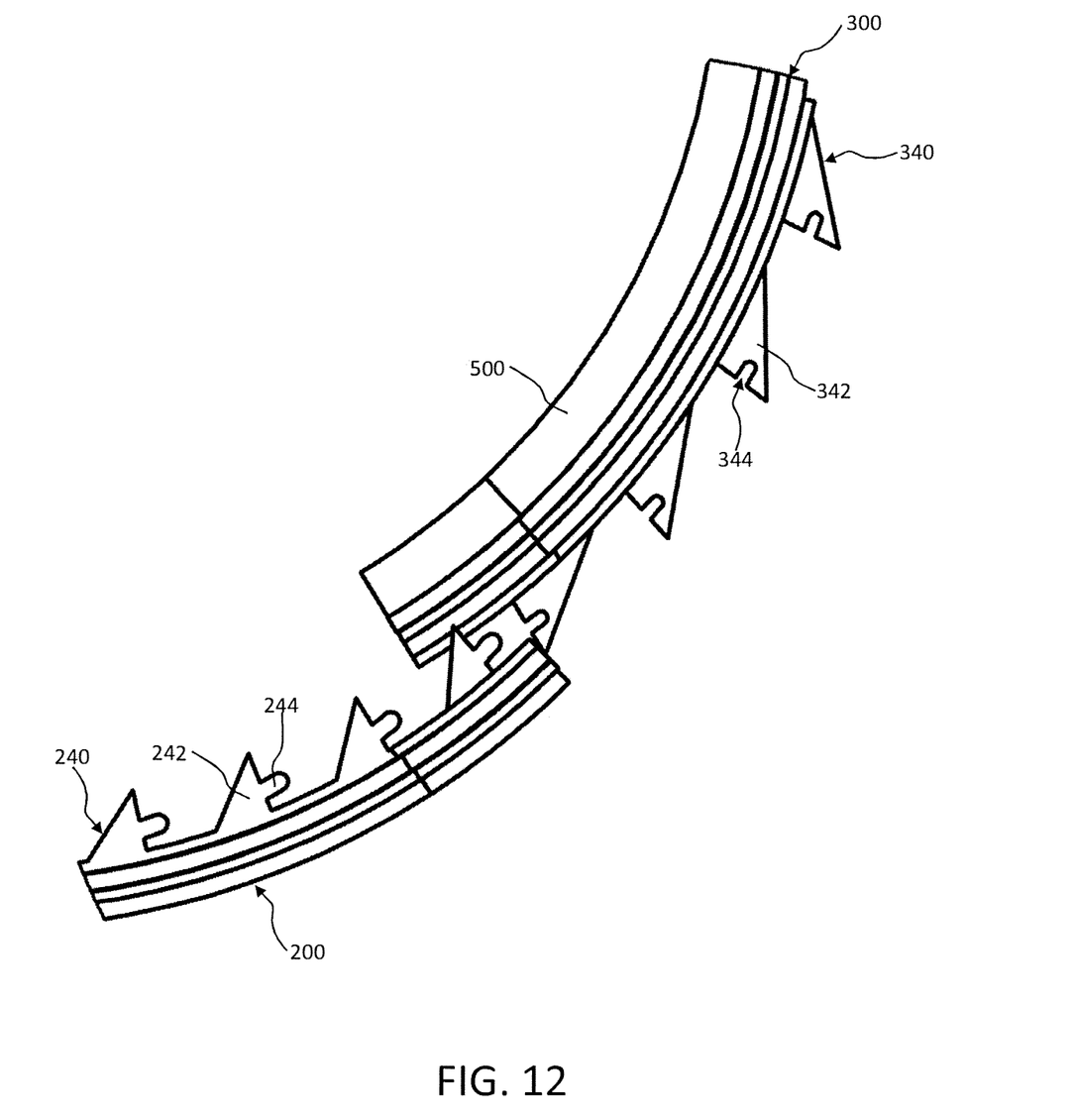
FIG. 12 is a top view of the interlocking teeth of the protective apparatus of FIG. 1 wrapped in an outer containment belt, according an embodiment of the present invention

The second end 204 of the front plate assembly 200 and the second end 304 of the back plate assembly 300 overlap and the front toothed plate 240 and the back toothed plate 340 interlock to allow impact forces to be transferred from the second end 204 of the front plate assembly 200 and the second end 304 of the back plate assembly 300. A detailed view of the front toothed plate 240 and the back toothed plate 340 is shown in FIG. 12. The front toothed plate 240 includes a plurality of teeth 242 which are angled toward the second end 204 of the front plate assembly 200. Each of the plurality of teeth 242 includes a protrusion 244 pointed toward the second end 204 of the front plate assembly 200. The back toothed plate 340 includes a plurality of teeth 342 which are angled toward the second end 304 of the front plate assembly 300. In other words, the plurality of teeth 242 and the plurality of teeth 342 are angled toward each other. Each of the plurality of teeth 342 includes a recess 344 pointed toward the second end 304 of the front plate assembly 300. To close the protective apparatus 100 around the person or object to be protected, a user pushes the front plate assembly 200 over the back plate assembly 300 until the protective apparatus 100 has the desired outer circumference, and then pushes the front plate assembly 200 in toward the back plate assembly 300 to insert the protrusions 244 into the recesses 344. The pluralities of teeth 242, 342 allow for the protective apparatus 100 to be adjusted in size and quickly closed and released when pushed in one direction while still transmitting impact forces between the front plate assembly 200 and the back plate assembly 300.

In an exemplary embodiment, each of the plurality of teeth 242 and the plurality of teeth 342 has a base:height ratio of 1.5:1 (the base of the tooth being the leg parallel to the plate assembly and the height of the tooth being the leg extending away from the plate assembly). The protrusions 244 may have a bullnose shape and have a length of approximately 50% of the height of the plurality of teeth 242. The protrusions 244 may have a thickness of approximately 27% of the tooth height and be located starting at 48% of the height of the tooth from the base. The size, shape, and position of the recesses 344 will be the opposite of the protrusions 244 such that the protrusions 244 fit snugly in the recesses 344.

Figure 13:
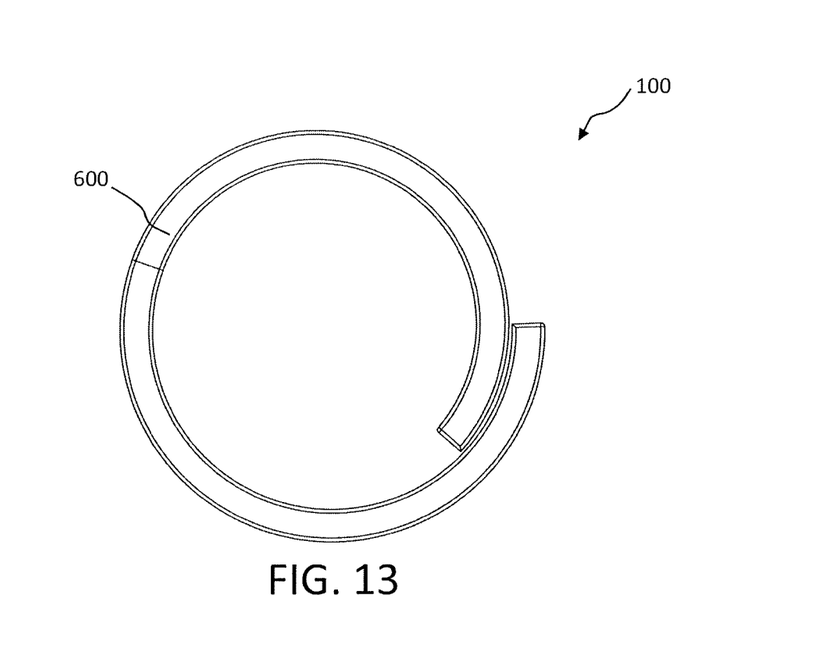
FIG. 13 is a top view of the protective apparatus of FIG. 1 wrapped in an outer containment belt, according an embodiment of the present invention.
Figure 14:
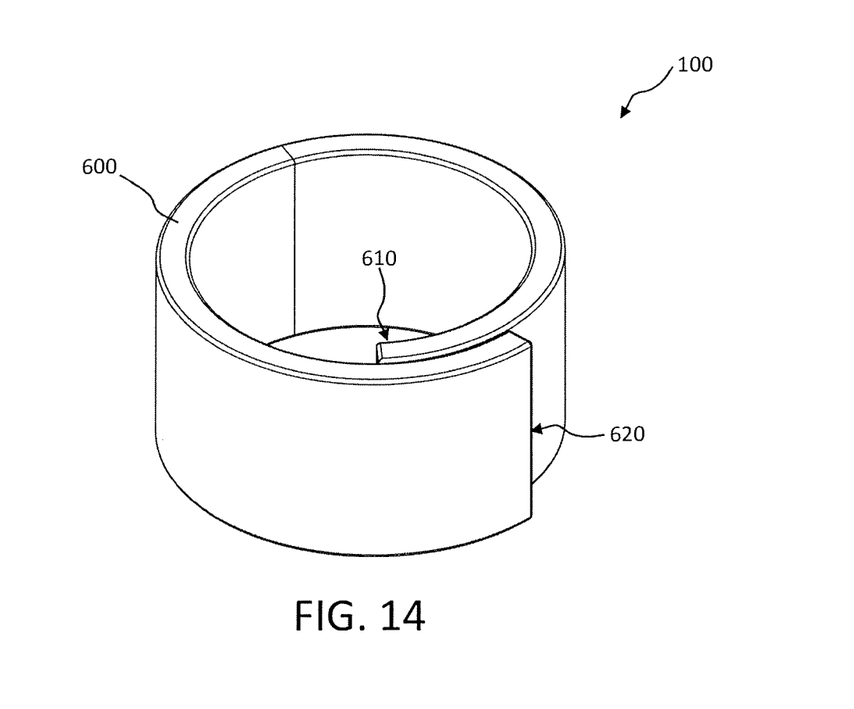
FIG. 14 is a perspective view of the protective apparatus of FIG. 1 wrapped in an outer containment belt, according an embodiment of the present invention.

Referring to FIGS. 13-14, the protective apparatus 100 may include an outer containment belt 600 which tightly wraps around the front plate assembly 200, the back plate assembly 300, the hinge 400, and the inner padding layer 500. The outer containment belt has a first end 610 (corresponding to the second end 304 of the front back plate assembly 300) which overlaps with a second end 620 (corresponding to the second end 204 of the front back plate assembly 200). The first end 610 and the second end 620 are connected by a suitable fastening element which can be easily engaged and disengaged to connect and disconnect the first end 610 and the second end 620, for example a fabric hook-and-loop fastener. When the first end 610 and the second end 620 are connected, the outer containment belt 600 ensures that the front plate assembly 200 and the back plate assembly 300 stay rigidly connected. In embodiments where the protective apparatus 100 is used to protect a human being, the outer containment belt 600 is preferably made of an anti-microbial, abrasive resistant material.

Figure 15:
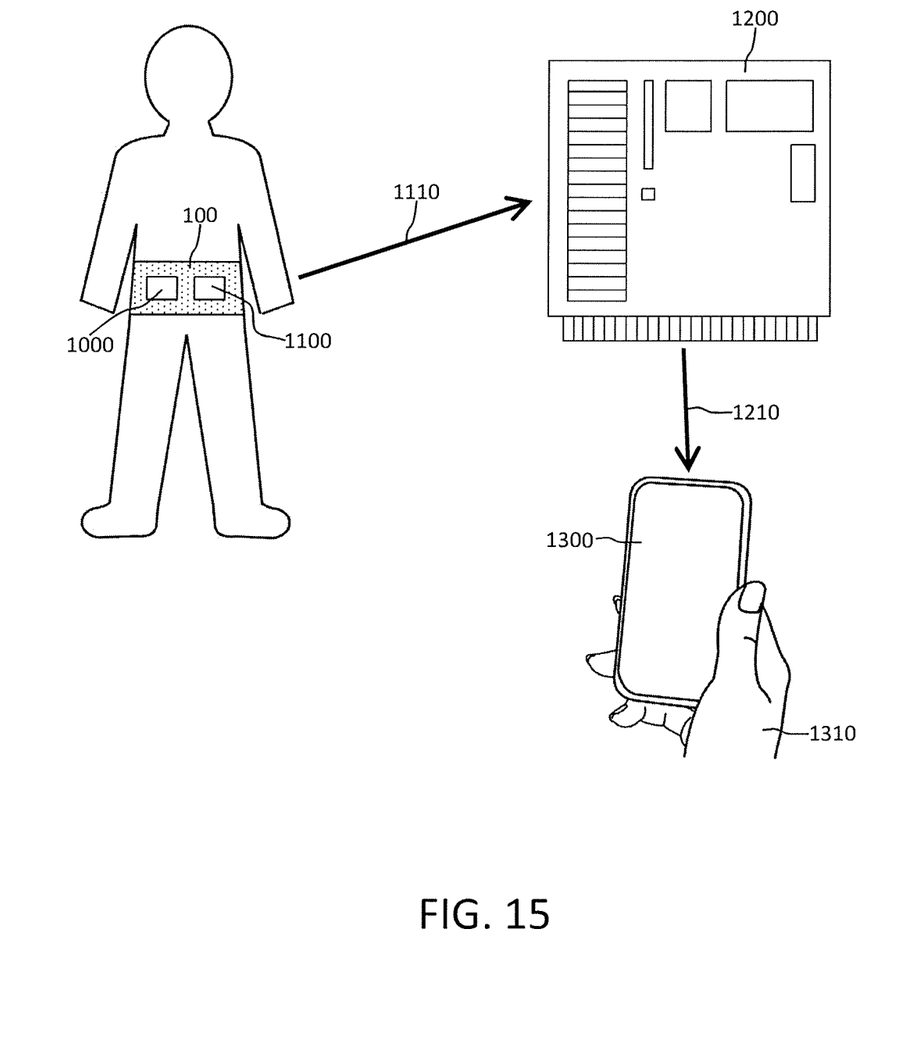
FIG. 15 is a schematic view of a remote notification system including the protective apparatus of FIG. 1, according an embodiment of the present invention.

Referring to FIG. 15, in some embodiments, the protective apparatus 100 includes force and accelerometer sensors 1000 and electronics 1100 which permit the real-time transmission of some or of the signals 1110 generated by the sensors to a remote server 1200 for analysis using appropriate algorithms to determine, among other calculations, the level of force imparted to the protective apparatus 100. Other sensors 100 may also be included to monitor other physiological conditions, such as heart rate or pulse. The sensors 1000 are preferably incorporated into one or more of the plate assemblies, such as the front plate assembly 200, the back plate assembly 300, or both. The electronics 1100 may also be incorporated into the plate assemblies, or may be incorporated into any other component of the protective apparatus 100, such as the outer containment belt 600. The remote server 1200 is then capable of providing an alert notification signal 1210 to an electronic device 1300 of one or more remote recipients 1310 who are communicatively connected to the remote server 1200 and have requested real-time notification information about the object or person being protected by the protective apparatus 100. Embodiments also include algorithms using the sensed impact force data to calculate effects of such forces on the object or person being protected by the protective apparatus 100, and to compare the forces to a stored database 1210 of similar forces to determine whether an alert notification should be provided to the electronic device 1300 of one or more remote recipients 1310. Embodiments may also include algorithms for determining the cumulative impact forces the protective apparatus 100 is subjected to in order to monitor the wear and fatigue life of the protective apparatus 100.

In some embodiments, the protective apparatus 100 may include an external diagnostic device to determine if the integrity of the plate assemblies (e.g., the front plate assembly 200 and the back plate assembly 300) has been compromised (e.g., if the plate assemblies are cracked or otherwise unable to protect from impact forces). The external diagnostic device may include a continuous thin-film electrically conductive membrane 700 which is applied across one or more surfaces of the front plate assembly 200, the back plate assembly 300, and the hinge 400. In some embodiments, the conductive membrane 700 may be applied the entire surface of the front plate assembly 200, the back plate assembly 200, and the hinge 400. The conductive membrane 700 includes at least two terminal pads separated by a distance. An ohm meter is used to measure the conductivity between two of the terminal pads to detect damage. If the front plate assembly 200, the back plate assembly 200, or the hinge 400 is broken or damaged between the two terminal pads, the measured conductivity would be zero. The protective apparatus 100 may include multiple conductive membranes 700 to detect partial cracks or fractures which do not propagate across the entire protective apparatus 100. In some embodiments, rather than manually conductivity between the two terminal pads, the external diagnostic device may include an LED display system including a battery-powered circuit connected to the terminal pads. When the circuit is broken (i.e., the conductive membrane 700 is broken), the LED display illuminates to indicate the break. Alternatively, the LED display may be illuminated when the circuit is intact and change color or be extinguished to indicate a break, although such systems would require a larger battery. In other words, the LED display changes states (e.g., on to off, off to on, or from a first color to a second color) to indicate a break. The LED display would thereby provide a real-time visual diagnostic indicator of the integrity of the plate assemblies. In still other embodiments, the conductivity between the terminal pads may be monitored by the electronics 1100 and a signal representing the conductivity may be sent to the remote server 1200 for analysis and communication to the electronic device 1300.

Figure 16:
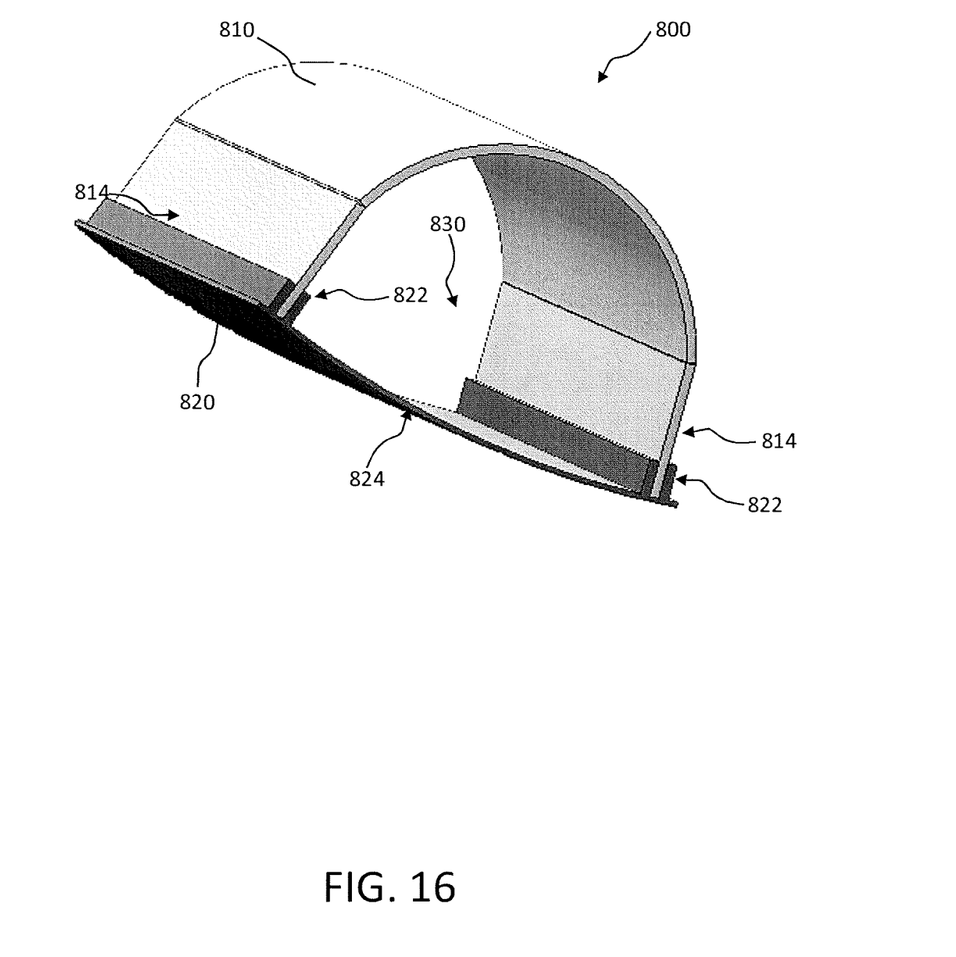
FIG. 16 is a perspective view of a protective apparatus including a plate assembly and a lateral load dispersion connector, according an embodiment of the present invention.

Referring to FIG. 16, another protective apparatus 800 is provided. The protective apparatus 800 is suitable for situations where use of the wrap-around design of the protective apparatus 100 is impractical or impossible. The protective apparatus 800 includes a plate assembly 810 and a lateral load dispersion connector 820 which combine to define a closed interior space 830 within the protective apparatus 800. The closed interior space 830 is substantially round in cross section, but may have any suitable shape. The shape of the interior space 830 will vary based on the object to be protected. For example, the semi-round shape of the closed interior space 830 in FIG. 16 may be suitable for protecting the collarbone region of a human being. The plate assembly 810 is approximately u-shaped, with two approximately parallel ends 814. However, the precise shape of the plate assembly 810 will vary depending on the object being protected. The protective apparatus 800 may also be lined with an inner padding layer (not shown) similar to the inner padding layer 500 described above which is attached to the plate assembly 810. The protective apparatus 800 may also be wrapped in an outer containment belt (not shown) similar to the outer containment belt 600 described above.

Like the front plate assembly 200 and the back plate assembly 300 described above, the plate assembly 810 is constructed of multiple layers including a force absorbing layer sandwiched between two plate layers. In an exemplary embodiment, the plate assembly 810 includes an outside plate, an inside plate, and an internal padding layer between the outside plate and the inside plate. The outside plate and the inside plate may be made any suitable substantially rigid protective material, for example polycarbonate plate having a thickness of approximately 0.125 inches. The material composition and thickness of the outside plate and the inside plate will vary based on the anticipated maximum axial force the protective apparatus will be subjected too. The outside plate and the inside plate may have substantially the same or substantially different thicknesses. Typically, the thickness and material composition of outside plate and the inside plate will be substantially similar. The internal padding layer may be made of a foam material, preferably a closed-cell foam arranged in a checkerboard pattern having a thickness of approximately 0.1 inches. The plate assembly 800 may be wrapped in sealed with a sealing layer (not shown), for example a layer of carbon fiber reinforced polymer resin (e.g., epoxy). The plate assembly 800 may also include one or more additional layers (not shown), for example an additional inner plate sandwiched between two internal padding layers.

The lateral load dispersion connector 820 includes two channels 822 at each end of a connecting bar 824. The channels 822 fit over the ends 814 of the plate assembly 810. The connecting bar 824 may be straight or curved to achieve the desired size and shape of the interior space 830. Like the hinge 400, the lateral load dispersion connector 820 may be made of any suitable material which will vary based on the anticipated magnitude of the impact forces, for example aluminum, titanium, steel, or composites. When the plate assembly 810 is subjected to an axial impact force, the force will be transferred from the plate assembly 810 to the lateral load dispersion connector 820 and around the object being protected in the interior space 830.

Certain preferred embodiments of the inventive methods, systems, and devices for protecting a person or object from impact forces, and for measuring those impact forces, have been described herein. It is to be understood that various modifications may be made to these described embodiments without departing from the spirit and scope of the invention. All such modifications and other embodiments are intended to be within the scope of the above description and in the following claims.

What is claimed:

1. A protective apparatus comprising:
    a first plate assembly including
        a first end and a second end and
        a first outer surface opposite a first inner surface;
    a second plate assembly including
        a first end and a second end and
        a second outer surface opposite a second inner surface;
    a load-bearing hinge connecting the first end of the first plate assembly to the first end of the second plate assembly, wherein when the hinge is closed, the second end of the first plate assembly and the second end of the second plate assembly overlap;
    a first toothed plate attached to the first outer surface at the second end of the first plate assembly, the first toothed plate having
        a first plurality of teeth angled toward the second end of the first plate assembly, each of the first plurality of teeth including a protrusion pointed toward the second end of the first plate assembly; and
    a second toothed plate attached to the second inner surface at the second end of the second plate assembly, the second toothed plate having a second plurality of teeth angled toward the second end of the second plate assembly defining a tooth surface closest to the second end,
        each of the second plurality of teeth including a recess being an opening on the tooth surface closest to the second end;
    wherein, each protrusions of the first plurality of teeth is adapted to engage the recesses in the second plurality of teeth to connect the second end of the first plate assembly and the second end of the second plate assembly.

2. The protective apparatus of claim 1, wherein the first plate assembly and the second plate assembly each include an outside plate, an inside plate, and an internal padding layer separating the outside plate and the inside plate.

3. The protective apparatus of claim 2, wherein the outside plate and the inside plate are made of polycarbonate and the internal padding layer is made of a closed-cell foam.

4. The protective apparatus of claim 3, wherein the outside plate, the inside plate, and the internal padding layer are wrapped in a carbon fiber-reinforced polymer sealing layer.

5. The protective apparatus of claim 1, further comprising a flexible inner padding located on the first inner surface and the second inner surface of the apparatus wherein, when the hinge is closed, the first plate assembly and the second plate assembly combine to define a closed interior space lined with the flexible inner padding.

6. The protective apparatus of claim 5, wherein the flexible inner padding layer is attached either to the first plate assembly or the second plate assembly.

7. The protective apparatus of claim 5, wherein the flexible inner padding layer is made of an open-cell foam.

8. The protective apparatus of claim 5, wherein the flexible inner padding layer includes a plurality of slots aligned with a plurality of holes in the first plate assembly and the second plate assembly.

9. The protective apparatus of claim 1, further comprising an outer containment belt which wraps around the first plate assembly, the second plate assembly, the load-bearing hinge, the first toothed plate, and the second toothed plate, the outer containment belt having a first end and a second end which removably attaches to the first end of the outer containment belt.

10. The protective apparatus of claim 9, wherein the second end of the outer containment belt removably attaches to the first end of the outer containment belt using a fabric hook-and-loop fastener.

11. The protective apparatus of claim 1, further comprising a continuous thin-film electrically conductive membrane applied across one or more surfaces of the first plate assembly, the second plate assembly, and the hinge.

12. The protective apparatus of claim 11, wherein the continuous thin-film electrically conductive membrane comprises sensors adapted to transmit signals to a remote server.

13. The protective apparatus of claim 11, further comprising an electronic device in communication with a remote server that is adapted to receives signals from a sensor attached to the continuous thin-film electrically conductive membrane.

14. The protective apparatus of claim 1, further comprising sensors and electronics for detecting a physical property of the protective apparatus and transmitting a signal generated by the sensors to a remote server.

15. The protective apparatus of claim 14, wherein the sensors measure impact forces imparted to the protective apparatus.

* * * * *

UNITED STATES PATENT AND TRADEMARK OFFICE
CERTIFICATE OF CORRECTION

PATENT NO. : 10,595,573 B2  
APPLICATION NO. : 15/201902  
DATED : March 24, 2020  
INVENTOR(S) : Kaydon A. Stanzione Page 1 of 1

It is certified that error appears in the above-identified patent and that said Letters Patent is hereby corrected as shown below:

In the Claims

At Column 10, Line 61 should read:
wherein, each protrusion of the first plurality of teeth is At Column 12, Line 18 should read:
server that is adapted to receive signals from a sensor Signed and Sealed this
Eighth Day of December, 2020

Andrei Iancu
*Director of the United States Patent and Trademark Office*